(12) United States Patent
Newton

(10) Patent No.: US 8,078,346 B2
(45) Date of Patent: Dec. 13, 2011

(54) CONVERTIBLE WIRELESS DISPLAY UNIT

(75) Inventor: Gary Newton, Adams, NY (US)

(73) Assignee: New York Air Brake Corporation, Watertown, NY (US)

( * ) Notice: Subject to any disclaimer, the term of this patent is extended or adjusted under 35 U.S.C. 154(b) by 665 days.

(21) Appl. No.: 12/235,203

(22) Filed: Sep. 22, 2008

(65) Prior Publication Data
US 2010/0072809 A1    Mar. 25, 2010

(51) Int. Cl.
*B60T 13/66* (2006.01)
(52) U.S. Cl. ............................................. 701/19; 303/7
(58) Field of Classification Search .................. 303/3, 7, 303/8, 127, 128, 15, 20; 701/2, 19, 29, 36, 701/50, 70, 20; 246/182 B
See application file for complete search history.

(56) References Cited

U.S. PATENT DOCUMENTS

| | | |
|---|---|---|
| 6,189,980 B1 | 2/2001 | Kull |
| 6,217,126 B1 | 4/2001 | Kull |
| 6,286,913 B1 | 9/2001 | Mazur et al. |
| 6,676,229 B1 | 1/2004 | Marra et al. |
| 7,257,471 B2 * | 8/2007 | Kornick et al. ................. 701/19 |
| 7,911,397 B2 * | 3/2011 | Degner et al. ................. 343/702 |
| 2005/0065673 A1 * | 3/2005 | Horst et al. ..................... 701/19 |
| 2009/0069961 A1 * | 3/2009 | Deepak et al. .................. 701/20 |

* cited by examiner

*Primary Examiner* — Joe Morano, IV
*Assistant Examiner* — Zachary Kuhfuss
(74) *Attorney, Agent, or Firm* — Barnes & Thornburg LLP

(57) ABSTRACT

An operator interface unit, includes a housing with a first electrical port having a first pair of terminals to be connect to a pair of network wires of the locomotive, and a second pair of terminals to be connected to a power source. A display and input device are on the housing. A transceiver assembly wirelessly communications with the ECP system. A controller assembly is connected to the first electrical port, the display, the input device and the transceiver assembly, and wherein the controller assembly is a node on the network via one of the first electrical port and the transceiver assembly. A portable assembly includes a battery source in a container which irremovably houses the operator interface unit.

11 Claims, 4 Drawing Sheets

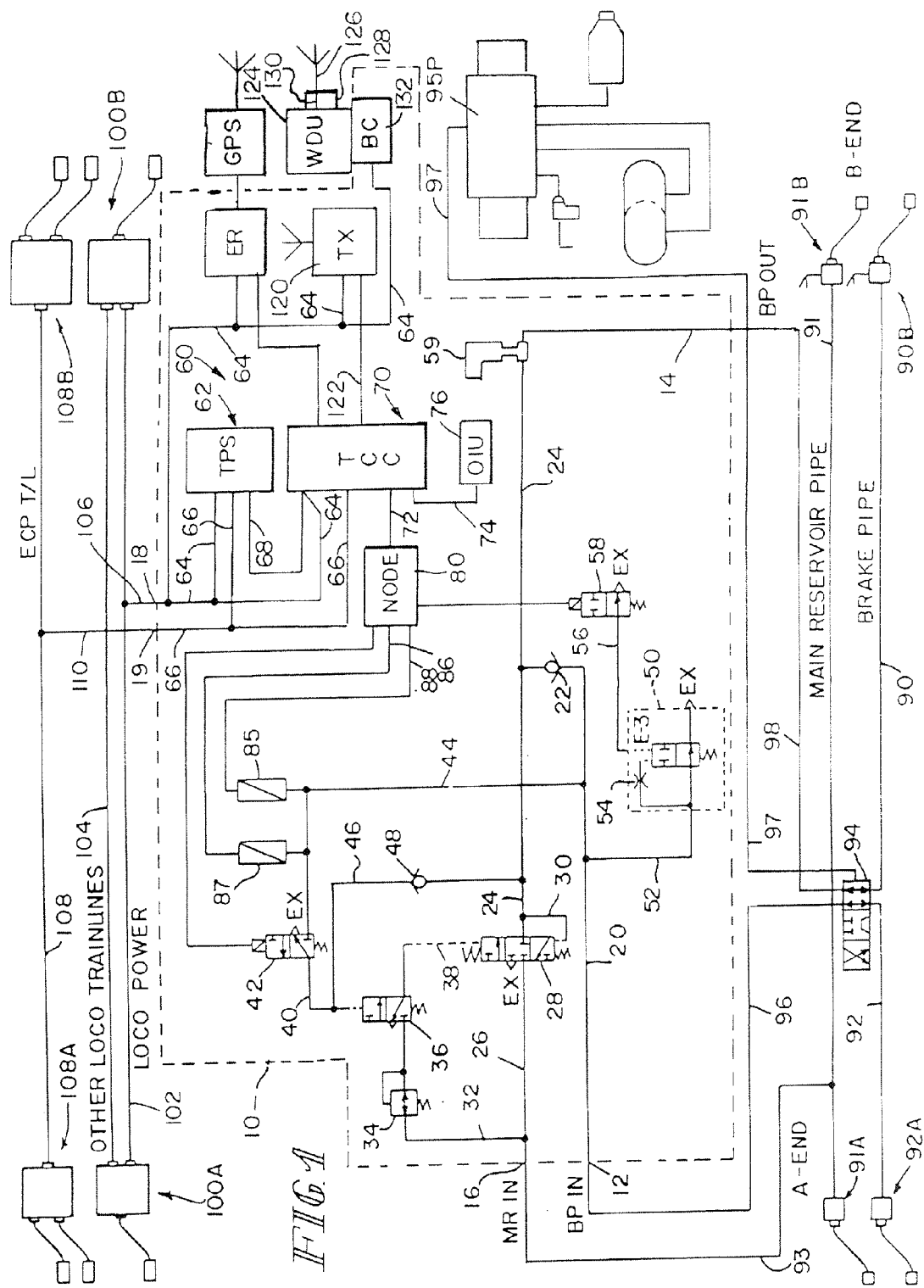

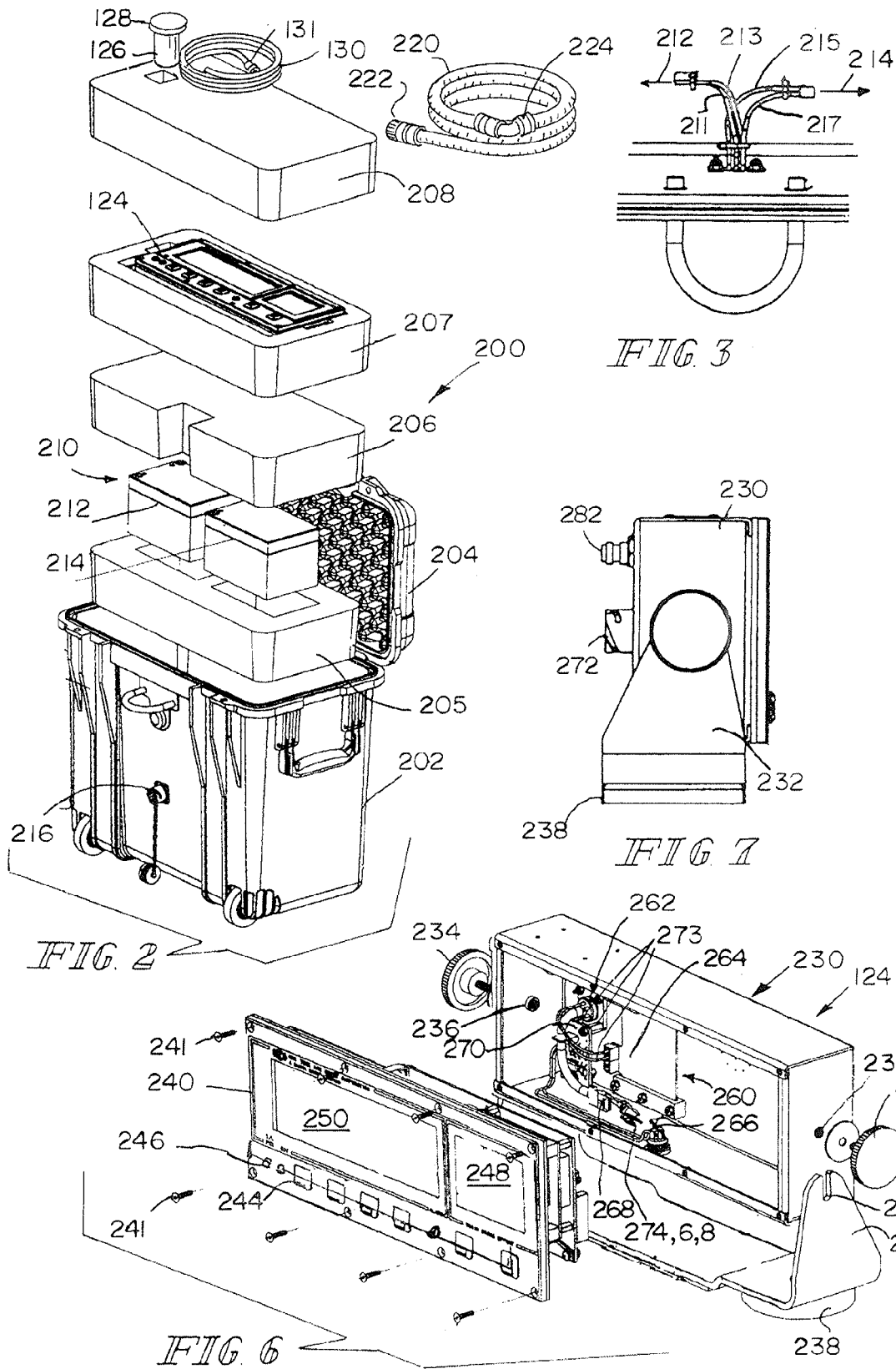

us 8,078,346 b2

CONVERTIBLE WIRELESS DISPLAY UNIT

BACKGROUND AND SUMMARY OF THE INVENTION

The present invention relates generally to railway pneumatic brake systems and, more specifically, to a wireless display unit for an interface between a pneumatic train brake control system and a train of electrically controlled pneumatic (ECP) brake equipped cars.

The freight train industry in the U.S. is transitioning from a completely pneumatically-controlled train to a train having ECP brake equipment on their cars. For the foreseeable future, not all locomotives will have the capability of interfacing with an ECP equipped train. They do not have the ability to provide the necessary power or electric control signals to the individual cars nor to control the brake pipe as required by the ECP cars. As presently configured, the train brake pipe is maintained at its charged value and is only used as a pneumatic back-up for failure of the ECP electrical control signals.

To meet this demand, various systems have been suggested. A limp-in control arrangement for ECP systems is described in U.S. Pat. No. 6,286,913. An interface which provides the appropriate level of power to the ECP trainline is described in U.S. Pat. No. 6,217,126. A locomotive to ECP brake conversion system which provides the appropriate power and control signals to the car trainline is described in U.S. Pat. No. 6,189,980. Another interface system is shown in U.S. Pat. No. 6,676,229.

The present interface system includes a housing with a first electrical port having a first pair of terminals to be connect to a pair of network wires of the locomotive, and a second pair of terminals to be connected to a power source. A display and input device are on the housing. A controller assembly is connected to the first pair of terminals as a node on the network, is connected to be powered by the second pair of terminals, is connected to drive the display and is connected to receive inputs from the input device. A transceiver for wireless communication with the ECP system is connected to an adapter which is also connected to the first pair of terminals to interface the transceiver to the controller assembly via the network.

The controller assembly has a second electrical port connected to the first and second pairs of terminals of the first electrical port. A cut-out circuit connects the second pair of terminal to the second electrical port of the controller and disconnects the second pair of terminal and the second electrical port if the voltage at the second pair of terminals is below a predetermined voltage.

The adapter and display are connected to be powered by the controller assembly at a second voltage lower than a first voltage at the second pair of terminals. The controller assembly includes a power port for providing the second voltage. The display and the adapter each include a power port, and a splitter connects the power port of the controller assembly to the power ports of the display and the adapter.

The first electrical port includes a third pair of terminals connected to each other. Auding a battery assembly includes a first and a second battery and a connector for matting with the first electrical port and having two pairs of positive and negative terminals connected to positive and negative terminals of a respective battery. The positive terminal of the connector of the first battery and the negative terminal of the connector the second battery mate with the second pair of terminals of the first electrical port. The positive terminal of the connector of the second battery and the negative terminal of the connector the first battery mate with the third pair of terminals of the first electrical port, thereby the batteries being in series to the second pair of terminals.

The connector of the battery assembly includes a third pair of terminals connected to each other; wherein when the connector is mated with a dual battery charger, the third pair of terminals activates the charger. The battery assembly is in a container having a third electrical port including the two pairs of positive and negative terminals connected to positive and negative terminals of a respective battery, and the connector mates with the first and third electrical ports. The container includes a compartment to removable accommodate the operator interface unit and the connector.

Another includes a housing with a first electrical port having a first pair of terminals to be connect to a pair of network wires of the locomotive, and a second pair of terminals to be connected to a power source. A display and input device are on the housing. A transceiver assembly wirelessly communications with the ECP system. A controller assembly is connected to the first electrical port, the display, the input device and the transceiver assembly, and wherein the controller assembly is a node on the network via one of the first electrical port and the transceiver assembly.

A portable operator interface includes a container having a lid and an external first electrical port. A battery source in the container electrically is connected to the first electrical port. An operator interface unit is removable housed in the container and has a display, an input device, a transceiver, a second electrical port and an antenna port. An antenna is removable housed in the container and has a connector for mating with the antenna port. A cable is removable housed in the container and has a pair of connectors for mating with the first and second electrical ports respectively.

These and other aspects of the present invention will become apparent from the following detailed description of the invention, when considered in conjunction with accompanying drawings.

BRIEF DESCRIPTION OF THE DRAWINGS

FIG. 1 is a schematic of an embodiment of an interface system incorporating the principles of the present disclosure.

FIG. 2 is an exploded view of a portable operator interface assembly incorporating the principles of the present disclosure.

FIG. 3 is a partial plane view of the connection of a battery supply to an external port of a container.

FIG. 6 is an exploded view of an operator interface unit incorporating the principles of the present disclosure.

FIG. 7 is a side view of the assembled operator interface unit of FIG. 6

DETAILED DESCRIPTION OF THE PREFERRED EMBODIMENTS

Figure 4:
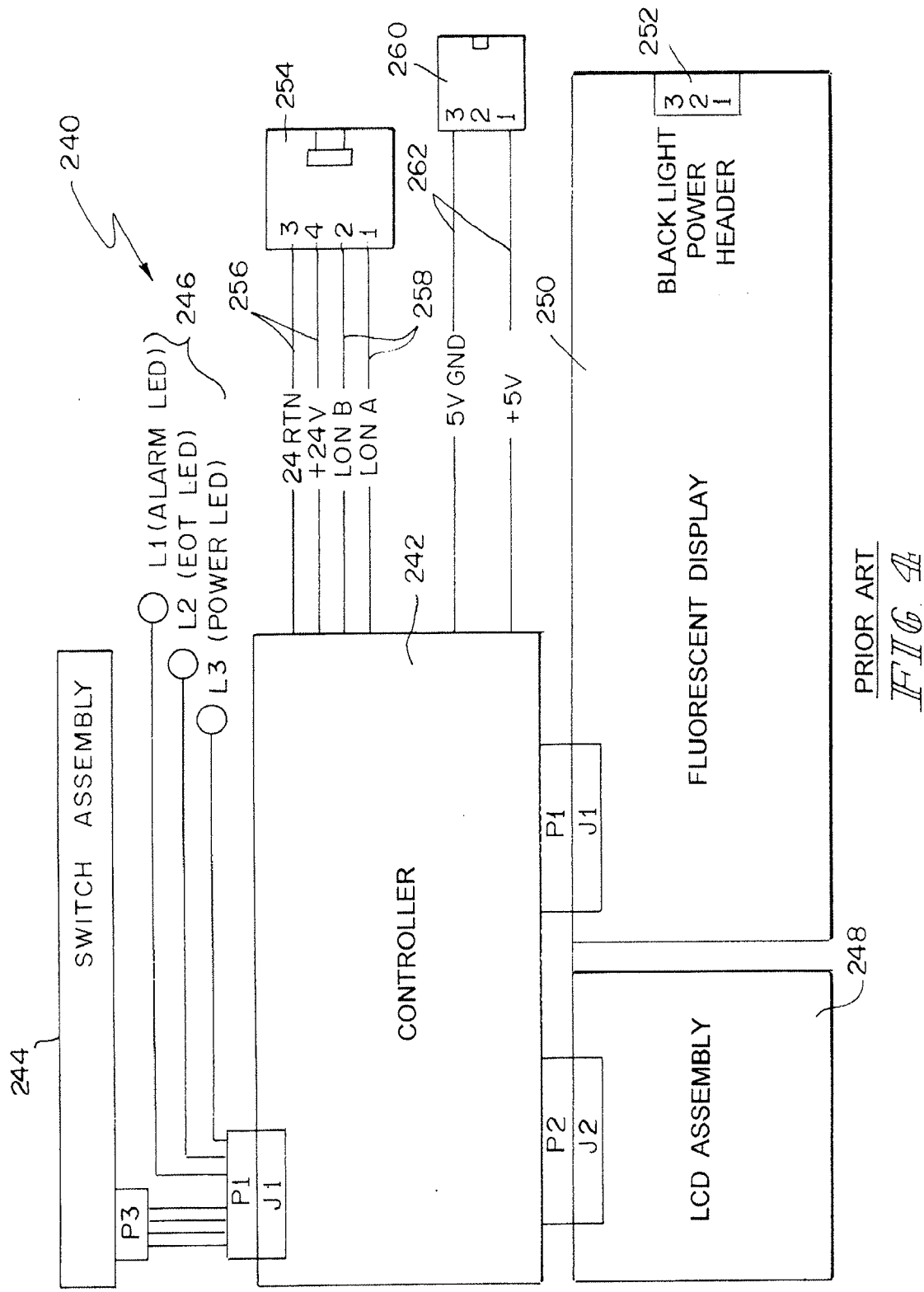
FIG. 4 is an electrical block diagram of a display unit, input device and controller assembly of an operator interface unit of the prior art.

FIG. 1 illustrates an interface system 10 for interfacing a pneumatic train brake control system to a train of electrically-controlled pneumatic (ECP) brake equipped cars. The interface 10 includes a locomotive brake pipe port 12, a train brake pipe port 14, and a locomotive main reservoir pressure supply port 16. It also includes a locomotive electrical trainline terminal 18 and a train electrical trainline terminal 19. The interface system 10 monitors pressure on the locomotive brake pipe port 12 and controls the pressure on the train brake pipe port 14 in response to pressure on the locomotive brake pipe port 12. The interface 10 also provides ECP commands on the train electrical trainline terminal 19 in response to pressure on the locomotive brake pipe port 12 and provides electrical power on the train electrical trainline terminal 19 from the locomotive electrical trainline terminal 18.

The locomotive brake pipe port 12 is connected to the train brake pipe port 14 by line 20, check valve 22 and line 24. The locomotive supply port 16 is connected to line 24 by line 26 and a train brake pipe valve 28. The train brake pipe valve 28 is shown as a three-position relay valve in its lap position. The relay valve 28 compares the pressure on the train brake pipe line 24 via line 30 against the pilot signal on line 38. The pilot signal on 38 is provided from the locomotive supply port 16 via line 32, a feed or pressure regulating valve 34 and a valve 36. The valve 36 is controlled via a signal on line 40, which is connected to the locomotive brake pipe port 12 and line 20 via line 44 and electropneumatic valve 42. The electropneumatic valve 42 is electrically controlled to connect the pressure on the locomotive brake pipe port 12 to move valve 36 from its shown exhaust position to a through position. This allows the regulated pressure from the locomotive supply port 16 to be applied to line 38 to pilot the relay valve 28.

The train brake pipe port 14 is also connected via line 24, check valve 48 and line 46 to the control input of valve 36. During charging, the check valve 48 is closed since the output of relay valve 28 is higher than the pressure on lines 46 and 40 (locomotive brake pipe port 12). If the pressure at the train brake pipe port 14, after charging, drops below that on lines 40 and 46, which is generally below the locomotive brake pipe port 12, check valve 48 will open. A vent valve 59 is also connected to the train brake pipe port 14 to sense an emergency condition and accelerate the blow down of the car brake pipe port pressure.

Interface 10 also includes a locomotive emergency valve. This valve includes a pneumatic valve 50 connected to the locomotive brake pipe port 12 via lines 52 and 20. Valve 50 is shown connecting the locomotive brake pipe port 12 to exhaust. When the pressure in the locomotive brake pipe port 12 is high enough via line 54, valve 50 moves down disconnecting line 52 from exhaust. A second control signal on line 56 from electropneumatic valve 58 also controls the position of emergency valve 50. Valve 58 receives its signals from the controller 60 to connect and disconnect line 56 from exhaust. If the controller 60 should fail, valve 58 will assume this exhaust position producing an emergency condition. The controller 60 also initiates power (throttle) cut-off on the locomotive(s) in response to an emergency.

The controller 60 in FIG. 1 is illustrated as including a trainline power supply module 62 connected to the locomotive electrical trainline terminal 18 via wire 64 and to the train electrical trainline terminal 19 via wire 66. It also provides a connection via line 68 to a trainline communications controller 70. Trainline communications controller 70 is also connected to the locomotive electrical trainline terminal 18 via wire 64 and to the train electrical trainline terminal 19 via wire 66. The trainline power supply module 62 and the trainline communications controller 70 are products available from New York Air Brake Corporation. Similar equivalent systems may be used and are a part of the known control systems in the locomotive for the ECP brake systems in a train. These systems take power from the locomotive electrical trainline terminal 18 and provide power and control signals on the car electrical trainline terminal 19 and the ECP trainline 108. The trainline communications controller 70 monitors the pressure at the locomotive brake pipe port 12 via transducers 85 and 87 and provides electrical control of electropneumatic valves 42 and 58 and converts this pressure to ECP trainline brake commands.

In this embodiment an input/output node 80 is connected to the trainline communications controller TCC 70 via line 72. The node 80 is connected to electropneumatic valve 42 via line 82 and to electropneumatic valve 58 via line 84. The node 80 is also connected to two transducers 85 and 87 via lines 86 and 88, respectively. The transducers 85 and 87 monitor the conditions in line 44, which is connected via line 20 to the locomotive brake pipe port 12. An operator interface unit 76 is connected via line 74 to the TCC 70. This provides an operator display for train set-up and other functions. Depending upon the type of TCC modules 70 used, node 80 may be eliminated and the connection to the TCC module 70 be made direct.

The elements of the system so far described are the same as in U.S. Pat. No. 6,676,229 and reference should be made thereto for complete explanation of their operation. U.S. Pat. No. 6,676,229 is incorporated herein by reference.

The interface system 10 mounted to a car having an A-end and a B-end. This is by way of example, and the terminals and ports of the interface system 10 may be connected individually to the appropriate locomotive and car terminals and connectors. A first brake pipe portion 90 is connected to a B-end connector 90B, and a second brake pipe portion 92 is connected to an A-end connector 92A. A change over valve 94 allows reversing the connection of the brake pipe portions 90 and 92 to the locomotive brake pipe port 12 and the car/train brake pipe port 14 via lines 96 and 98, respectively. The change over valve is a three position valve compared to the two position transition valve discussed in U.S. Pat. No. 6,676,229. The first two positions of the change over valve are the same as the two positions of the transition valve. The third position of the change over valve is a direct connection of the two brake pipe portions 90 and 92. This allows the locomotive brake pipe to control the car/train brake pipe for a standard pneumatic train.

In the position shown for the change over valve 94, the locomotive is at the A-end and its brake pipe connected at connector 92A, and the car at the B-end having its brake pipe connected to connector 90B. When the transition valve 94 is moved to the second position, the locomotive is at the B-end, and the car is at the A-end. In the first and second positions, the change over valve 94 isolates the two brake pipe portions 90 and 92. In the third position, the change over valve disconnects the locomotive brake pipe port 12 and the car/train brake pipe port 14 from the brake pipe portions 90 and 92 and directly connect the two brake pipe portions 90 and 92.

The locomotive supply port 16 is connected to a supply line 91 having connectors 91A and 91B. As illustrated and known in the industry, this is the main reservoir pipe of a locomotive consist.

The car illustrated in FIG. 1 has a standard pneumatic or conventional brake control valve 95P. It is connected by line 97 to the locomotive brake pipe port 12 by the change over valve 94 in all three of its positions. Thus the brake control valve 95P is responsive to the pressure on the locomotive brake pipe from the locomotive side for all positions of the change over valve 94. A standard pneumatic or conventional system 95P includes a pneumatic brake control valve, a pair of reservoirs, a retainer and a brake cylinder. All of these are shown but not marked, since they are well known. This provides a brake set on the car to which the interface system 10 is mounted. An EPC brake control valve may also be used as shown in FIG. 2 of U.S. Pat. No. 6,676,229, which is incorporated herein by reference.

For the electrical connections, electrical connectors 100A and 100B provide interconnection to the locomotive consist. Schematically, the locomotive power line 102 is shown, and the remainder of the locomotive trainlines are shown by a single line 104. These lines are the MU multi-unit lines well known in the freight industry. Locomotive power line 102 is connected via line 106 to the locomotive electrical trainline terminal 18 of the interface system 10. Train electrical trainline connectors 108A and 108B have an ECP trainline 108 there between to be connected to the train electrical trainline terminal 19. The ECP trainline 108 is connected via wire 110 to the train electrical trainline terminal 19.

The present interface system 10 includes a transceiver 120 connected to the TCC 70 via line 122. It is also powered via line 64. The transceiver 120 provides wireless communication with the controller 60. A wireless display unit WDU 124 communicates via the transceiver 120 with the controller 60 and displays information from the controller 60 to the operator of the locomotive remote from the interface system 10. In addition to the display of information, WDU 124 allows the operator to send commands to the TCC 70 such as ECP Trainline Empty/Load setting and ECP Trainline Power ON/Off setting. The wireless display unit WDU 124 may also be considered an operator interface unit.

The wireless display unit WDU 124 includes an antenna 126 removably mounted to the display unit by a mount 128 and electrically connected via line 130. The mount 128 allows the antenna 126 to be separated physically demounted from wireless display unit 124 and mounted to the vehicle to which the operator carries it. This is generally the lead locomotive. The mount 128 may be any well-known device, for example, a magnet. Suction cups or other devices may be used. The wireless display unit 124 includes a chargeable power supply, for example, a battery. The interface includes a charger 132 connected via line 64 to the source of power. The battery may be removed from the display unit 124 and connected to the charger 132 or the display unit 124 can have a terminal which mates with the charger 132.

The wireless communication between the transceiver 120 and the wireless display unit 124 may be via, for example, WiFi. Other communication protocols may be used. The wireless display unit WDU 124 should have a unique link to the corresponding TCC 70 to ensure that the data transmission there between is secure. A given WDU 124 may be initially linked by the operator to any available TCC 70. The WDU 124 will remain linked only to the specific TCC 70 until changed by the operator. Once and as long as the TCC 70 has established a link to a given WDU 124, the TCC 70 will reject all subsequent request for links from other WDUs. The communications are bidirectional to allow for error checking and interface heartbeat.

In an ECP train, each of the car control brake devices CCD are connected as nodes in a network, generally by a train wire. The WDU 124 will be assigned a network ID which will allow a secure, direct one to one communication with the TCC 70, which is a node on the network. Standard network protocols will be enforced in order to establish communication. Also, if the TCC 70 is communicating with another node or remote device, communication will not be established with the WDU 124. As further verification that the WDU 124 is communicating with the TCC 70, the TCC 70 will transmit its ECP reporting mark which corresponding to the ID on the side of the car. The operator can visually verify this information.

The information being transmitted from the controller 60 to the wireless display unit 124 for display includes train brake system status. This could include, for example, but not limited to brake pipe pressure at the end of train, percentage of operable brakes, ECP train brake commands, ECP status, train power status, any and all ECP interlocks and penalty brake applications, loss of power, empty load status etc.

Also various prompts may be transmitted from the control system 60 to the wireless display unit 124 for the operator in the lead locomotive. These would be, for example, informing the driver to place the conventional brake controller in a normal or graduated release mode. There may also be prompts to set the feed valve to various settings.

The wireless display unit 124 also displays its status and transmits this information to the controller 60. This may be, for example, the battery capacity indication and loss of communication between the wireless display unit 124 and the controller 60. Neither of these conditions may affect operation of the controller 60. Alternatively, the controller 60 may apply the brakes for loss of communication with the wireless display unit 124.

Embodiment of the portable operator interface assembly 200 is illustrated in FIGS. 2-7. The operator interface assembly in FIG. 2 includes a container 202 with a lid 204. A battery source 210 is illustrated as a pair of batteries 212 and 214 is connected by pairs of wires 211, 213 and 215, 217 as illustrated in FIG. 3, to the external electrical port 216. The wireless unit WDU 124 is provided in the compartment in the container 202. Also provided, container 202 is the antenna 126 with its cable 130 having a connector 131 and a power cable 220 has end connectors 222 and 224. The end connector 222 connects with the external port 216 on the container 202. The end connector 224 connects with electrical port 272 on the housing 230 of the WDU 124 (see FIG. 7). The connector 131 of the antenna cable 130 connects to antenna port 282 on the housing 230 of the WDU 124.

The batteries 212 and 214 are housed between the pair of Styrofoam packaging 205 and 206. The WDU 124 is received in a Styrofoam tray 207. The antenna 126 and its magnetic mount 128 are received into a Styrofoam tray 208. The antenna cable 130 and the power cable 220 rests on the top of Styrofoam tray 208.

As shown in FIG. 6, the WDU 124 includes a housing 230 mounted to a bracket 232 by the thumb wheels 232 extending through slot 233 in the bracket 232 and through aperture 231 in the side of the housing 230 and received by a nut or threaded shaft 236. A pair of magnetic mounts 238, are provided at the bottom of bracket 232. An operator interface unit 240 of the prior art is mounted to the housing 230 by fasteners 241.

As shown in FIG. 4, operator interface unit 240 of the prior art includes controller 242 connected to a switch assembly 244 and light emitting diodes 246. An LCD display 248 and a fluorescent display 250 are also connected to the controller 242. The fluorescent display 250 has a backlight power header connector or an electrical port 252. An electrical connector port 254 connects power wires 256 and the network wires 258 with the controller 242. The example shown is a LAN network which is used in ECP systems. Another power port or connector 260 is connected by wires 262 to the controller 242. In the prior art, the electrical port 254 is connected to the power supply and the network of the locomotive in which it is mounted. The power port 260 provides lower voltage or 5 Volts, compared to 24 Volts, received by the controller 240 and is provided by the controller via port 260 to port 252 for the backlight of the fluorescent display 250.

Figure 5:
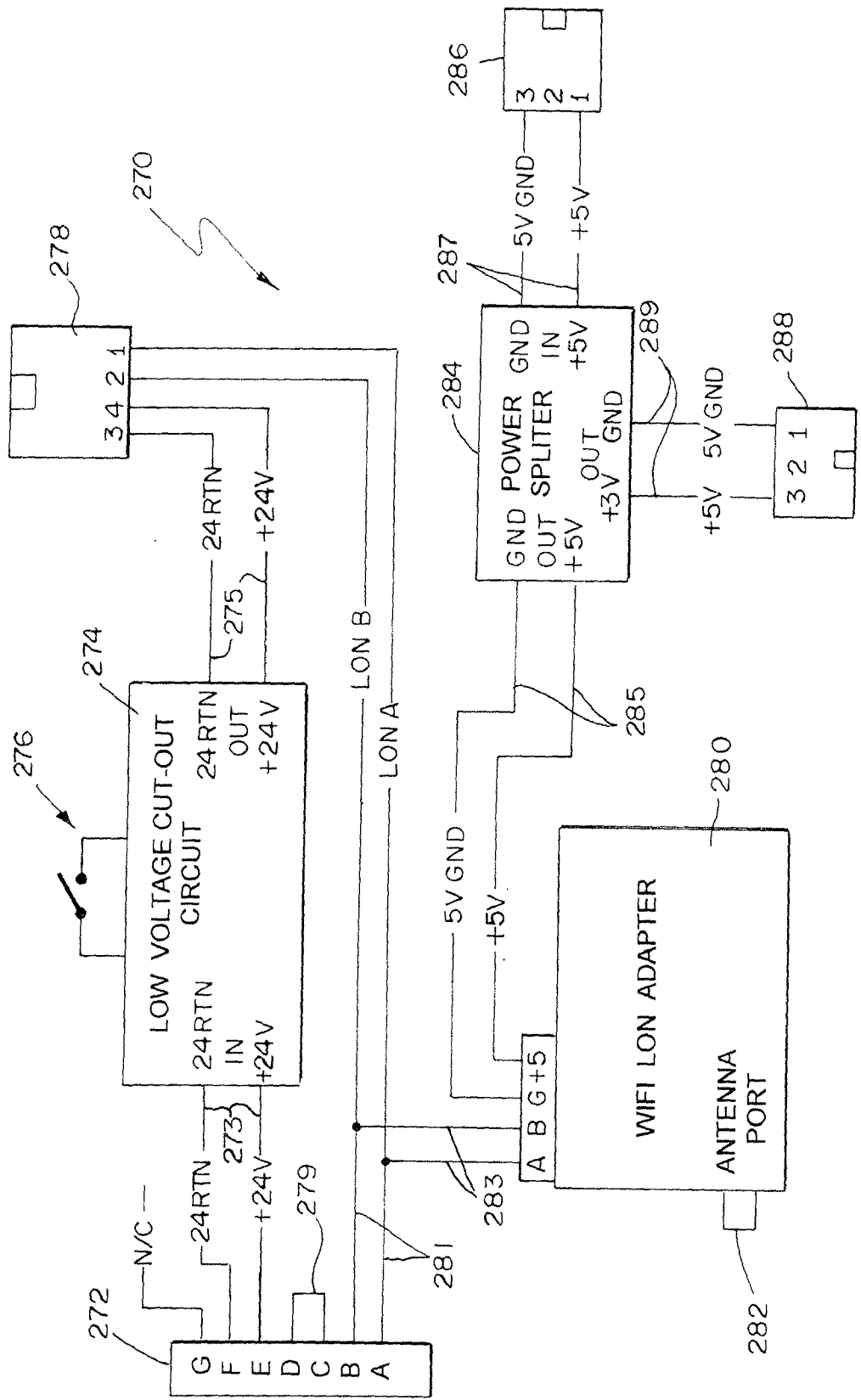
FIG. 5 is an electrical block diagram of an adapter, cut-out circuit and power splitter of a converter assembly incorporating the principles of the present disclosure used with the operator interface of FIG. 4.

Converter assembly 270 is provided in the housing 230 as illustrated in FIG. 6 and the schematic of FIG. 5 to allow the interface unit the WDU 124 and 240 to operate as a wired operator interface unit or a wireless interface unit. The converter assembly 270 is connected to the electrical port 272 on the housing 230. The two power cables 273 are connected to terminals E and F of the electrical port 272 to a low voltage cut-out circuit 274. The cut-out circuit 274 protects the batteries to be connected to electrical port 272 and the operator interface unit 240. A normally open momentary switch 276, when pressed, latches the low voltage cut-out circuit 274 on and provides power to the unit as long as voltage stays above a pre-selected threshold. If the voltage drops below the pre-selected threshold, the cut-out circuit 274 will disconnect the power. This prevents the batteries from being completely depleted and eventually causing damage to the batteries. Also disconnecting the batteries at a pre-determined level allows for faster and more predictable recharge time.

The electrical port/connector 278 is connected to the cut out circuit 274 by wires 275. Terminals A & B of the electrical port 272 are connected by wires 281 to the electrical port connector 278. The port 278 is connected to the port 254 of the WDU 124. Terminals D and C of the port 272 are interconnected by a wire 279.

The converter assembly 270 includes a combined transceiver and adapter assembly 280. That includes an antenna port 282 to be connected with connector 131 of the antenna cable 130. The combined transceiver and adapter 280, interfaces the transceiver signal to LAN network signal and provides it by wire 282 through to the LAN network terminals of connector or port 278. The combined transceiver and adapter 280 may be for example, a GR4A-WFTNI card, available from ADEPT Systems Inc of Eagle Mountain Utah.

The transceiver assembly 280 is powered by a power splitter 284 connected thereto by lines 285. The low voltage for example 5 volts are provided as an input to the power splitter 284 by connector or port 286 and lines 287. The connector port 286 is connected to the connector 270 of the controller 240 which provides the 5 Volts power. The power splitter 284 also includes a connector port 288 connected there to by wires 279. The connector port 288 is connected to the connector port 252 of the fluorescent display 250.

The connection of the batteries to the seven pin connector or port 216 is as follows:
Battery 214 pos. to socket contact C
Battery 212 neg. to socket contact D
Battery 212 pos. to socket contact E
Battery 214 neg. to socket contact F
contact G jumpered to socket contact A When the Battery pack 210 is installed in the Transition Vehicle and the battery charging cable 224 is connected to the circular connector 216 on the WDU Battery Pack, the dual battery charger outputs are enabled via contacts G and A being jumpered within the WDU Battery Pack 210. The jumpered contacts A and G have no effect on the operation of the OIU 240 when the WDU Battery Pack 210 is installed in the locomotive and connected to the WDU 124, as contact G is an unused contact in the WDU 124.

In the standard OIU, the circular connector 262 provides connectivity for both power and LON network connections. For the Wireless display unit WDU 124, the circular connector only provides connectivity for power. The Wi-Fi LON adapter 280 provides network connectivity to the Transition Vehicle wirelessly. This is achieved by using the same basic connectivity for power and LON in the WDU 124 internal wire harness as used in the standard OIU internal wire harness with the addition of the jumper wire 289. The standard OIU only uses four of the seven contacts or terminals in the connector. The Wireless OIU uses six of the seven contacts or terminals in the connector. In both cases, contactor terminal G is unused.

The wiring of the standard OIU internal wire harness is as follows:
Contact A—LON A
Contact B—LON B
Contact C—unused
Contact D—unused
Contact E—+24 VDC
Contact F—24V GND
Contact G—unused The wiring of the Wireless OIU internal wire harness is as follows:
Contact A—LON A
Contact B—LON B
*Contact C—12 VDC (Battery 214 pos input)
*Contact D—12V RTN (Battery 212 neg. input)
Contact E—12 VDC (Battery 212 pos. input)
Contact F—12V RTN (Battery 214 neg. input)
Contact G—unused
*Contact C is Jumpered to Contact D The OIU is a device that needs to be powered with 24 VDC across contacts E and F. Contact C being jumpered to Contact D inside the WDU 124 connects the two batteries in the WDU battery Pack 210 in series when the Battery cable 224 is connected, presenting the required 24 VDC to the WDU 124 across contacts E and F. If a standard OIU cable is connected to port 272 of the WDU, the unit will operate just as the standard OIU operates, as 24 VDC would be presented to contacts E and F, and LON network to contacts A and B. This allow the WDU 124 to be used in ANY application. As mentioned earlier, a standard OIU can easily be converted to a Wireless version, maximizing the use of common parts.

Although the present system has been described and illustrated in detail, it is to be clearly understood that this is done by way of illustration and example only and is not to be taken by way of limitation. The scope of the present system is to be limited only by the terms of the appended claims.

What is claimed:

1. An operator interface unit for an electrically controlled pneumatic (ECP) system which interfaces a locomotive pneumatic train brake control system to a train of ECP brake equipped cars, the interface unit comprising:
    a housing with a first electrical port having a first pair of terminals configured to be connected to a pair of network wires of the locomotive, and a second pair of terminals configured to be connected to a power source;
    a display and input device provided on the housing;
    a controller assembly connected to the first pair of terminals as a node on a network so as to be powered by the second pair of terminals, to drive the display and to receive inputs from the input device;
    a transceiver configured to provide wireless communication with the ECP system; and
    an adapter connected to the transceiver and the first pair of terminals and configured to interface the transceiver with the controller assembly via the network,
    wherein the controller assembly has a second electrical port connected to the first and second pairs of terminals of the first electrical port.

2. The interface unit of claim 1, including a cut-out circuit connecting the second pair of terminals to the second electrical port of the controller, the cut-out circuit disconnects the second pair of terminals and the second electrical port if the voltage at the second pair of terminals is below a predetermined voltage.

3. The interface unit of claim 1, wherein the adapter and display are connected to be powered by the controller assembly at a second voltage lower than a first voltage at the second pair of terminals.

4. The interface unit of claim 3, wherein the controller assembly includes a power port for providing the second voltage, the display and adapter each include a power port, and a splitter connects the power port of the controller assembly to the power ports of the display and the adapter.

5. The interface unit of claim 1, wherein the first electrical port includes a third pair of terminals connected to each other; and the unit further including a battery assembly having a first and a second battery and a connector for matting with the first electrical port and having two pairs of positive and negative terminals connected to positive and negative terminals of a respective battery;

the positive terminal of the connector of the first battery and the negative terminal of the connector of the second battery mate with the second pair of terminals of the first electrical port, and the positive terminal of the connector of the second battery and the negative terminal of the connector the first battery mate with the third pair of terminals of the first electrical port, thereby the batteries being in series to the second pair of terminals.

6. The interface unit of claim 5, wherein the connector of the battery assembly includes a third pair of terminals connected to each other; wherein when the connector is mated with a dual battery charger, the third pair of terminals activates the charger.

7. The interface unit of claim 5, wherein the battery assembly is in a container having a third electrical port including the two pairs of positive and negative terminals connected to positive and negative terminals of a respective battery, and the connector mates with the first and third electrical ports.

8. The interface unit of claim 7, wherein the container includes a compartment to removable accommodate the operator interface unit and the connector.

9. An operator interface unit for an electrically controlled pneumatic (ECP) system which interfaces a locomotive pneumatic train brake control system to a train of ECP brake equipped cars, the interface unit comprising:
 a housing with a first electrical port having a first pair of terminals to be connect to a pair of network wires of the locomotive, and a second pair of terminals to be connected to a power source;
 a display and input device on the housing;
 a transceiver assembly for wireless communication with the ECP system; and
 a controller assembly connected to the first electrical port, the display, the input device and the transceiver assembly, the controller assembly being a node on a network via one of the first electrical port and the transceiver assembly.

10. A portable operator interface assembly for an electrically controlled pneumatic (ECP) system which interfaces a locomotive pneumatic train brake control system with a train of ECP brake equipped cars, the interface assembly comprising:
 a container having a lid and an external first electrical port;
 a battery source provided in the container and being electrically connected to the first electrical port;
 an operator interface unit removably housed in the container and having a display, an input device, a transceiver, a second electrical port and an antenna port;
 an antenna removably housed in the container and having a connector for mating with the antenna port; and
 a cable removably housed in the container and having a pair of connectors for mating with the first and second electrical ports respectively,
 wherein the container includes a pair of wheels.

11. The interface assembly of claim 10, wherein the operator interface unit and the antenna have magnetic mounts for mounting the operator interface unit and the antenna to a locomotive.

* * * * *